I. L. DAVENPORT.
COMPUTING DEVICE.
APPLICATION FILED AUG. 18, 1908.
953,321.
Patented Mar. 29, 1910.
2 SHEETS—SHEET 1.
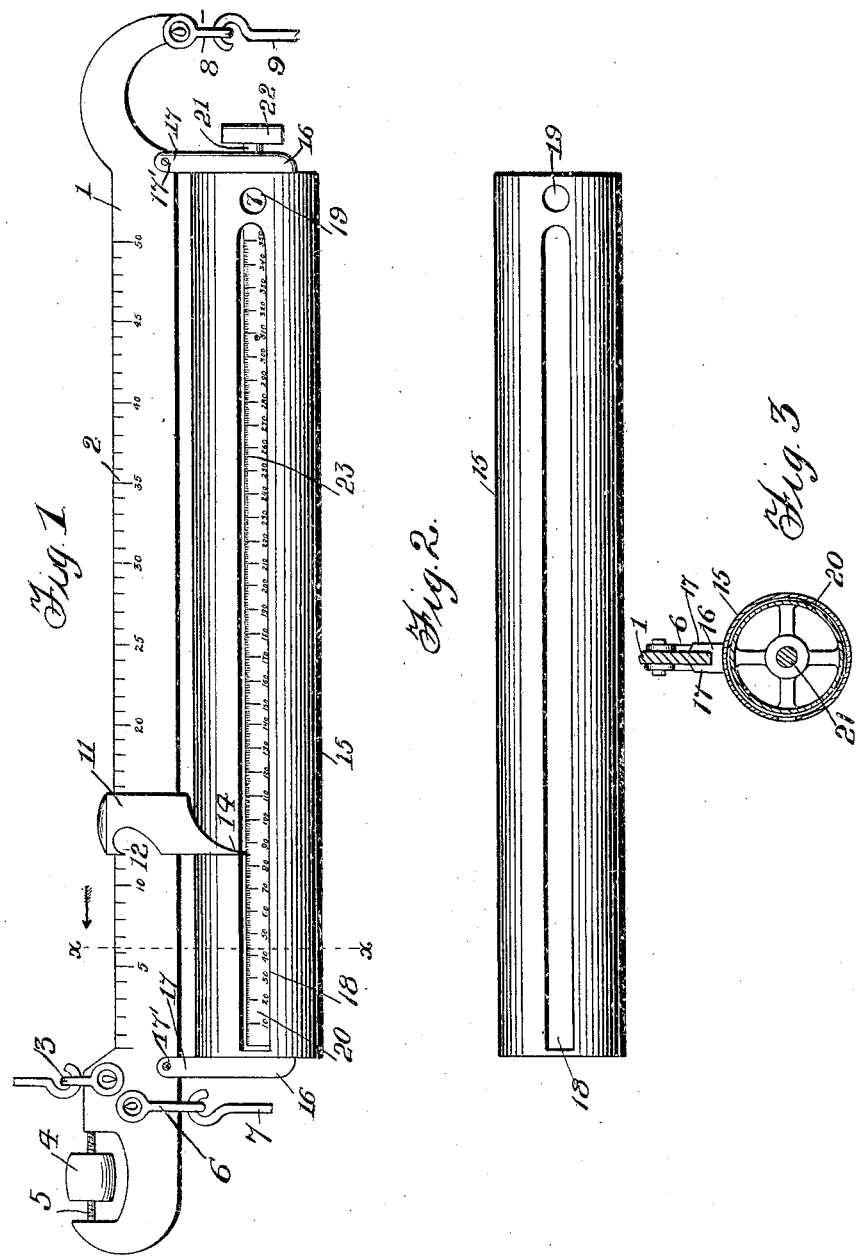
Witnesses
F. G. Campbell
Thomas V. Sullivan
Inventor
Isaac L. Davenport
By Connolly Bros.
Attorneys

I. L. DAVENPORT.
COMPUTING DEVICE.
APPLICATION FILED AUG. 18, 1908.

953,321.

Patented Mar. 29, 1910.
2 SHEETS—SHEET 2.

Witnesses
F. G. Campbell
Thomas V. Sullivan

Inventor
Isaac L. Davenport

By Connolly Bros.
Attorneys

UNITED STATES PATENT OFFICE.

ISAAC L. DAVENPORT, OF CAMDEN, NEW JERSEY, ASSIGNOR OF ONE-HALF TO FRANK A. CAVANAGH, OF ASHBOURNE, PENNSYLVANIA.

COMPUTING DEVICE.

953,321.  Specification of Letters Patent.  Patented Mar. 29, 1910.

Application filed August 18, 1908. Serial No. 449,108.

*To all whom it may concern:*

Be it known that I, ISAAC L. DAVENPORT, a citizen of the United States, residing at Camden, in the county of Camden and State of New Jersey, have invented certain new and useful Improvements in Computing Devices, of which the following is a specification.

This invention has relation to computing devices and relates particularly to computing devices for steelyard weighing scales and has for its object the provision of a novel device that may be readily attached to and detached from the pivoted and graduated weighing scale beam or a stationary graduated beam or rod, for the purpose of determining and indicating the total price of any desired amount of goods or articles having each a fixed price per unit, as per pound, yard, etc.

In its preferable form my computing device is adapted and intended to be applied to weighing scales having a pivoted scale beam of the steelyard type and a sliding poise and in such form and in a modified form which will be hereinafter described and in which a stationary graduated beam is employed, the computing device is so constructed as to be easily and quickly applied to the graduated beam (whether the latter is pivoted and movable or is stationary) and without any material alteration of the beam or any of its connected or appurtenant parts.

Figure 4:
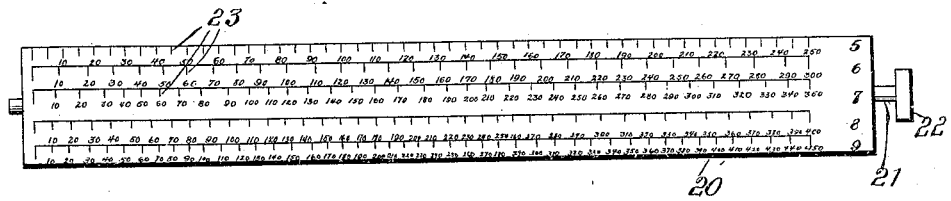
Figure 6:
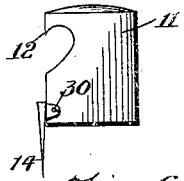
Figure 5:
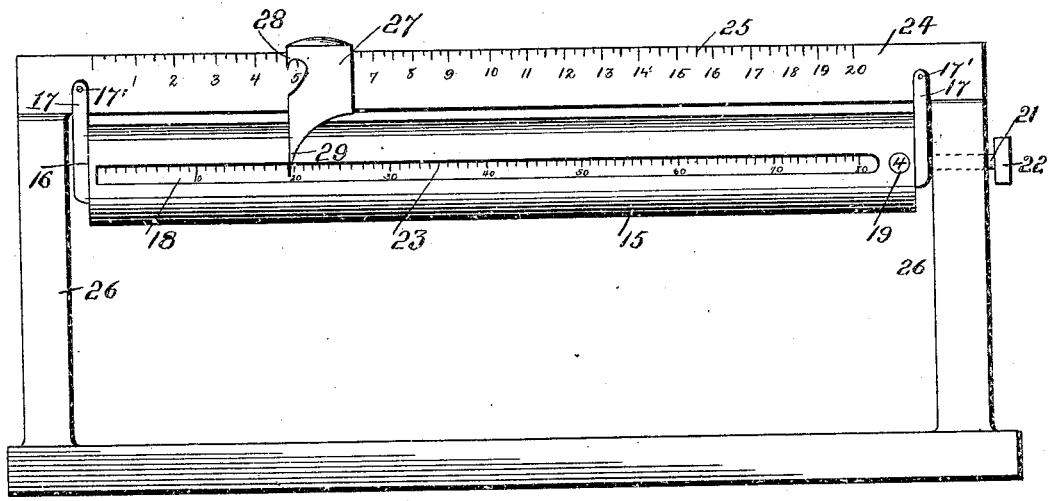

I have illustrated my invention in the accompanying drawings wherein:

Figure 1 is a side elevation of a weighing scale beam having my improved computing device attached. Fig. 2 is a side elevation of the casing or cover of the computing device. Fig. 3 is a vertical sectional view on the line $x$—$x$ of Fig. 1. Fig. 4 is a side elevation of a graduated cylinder constituting a portion of the computing device. Fig. 5 is a side elevation of a modified form of my improvement showing the computing device applied to a stationary beam. Fig. 6 is a side elevation of a modified form of sliding poise adapted to be applied to the scale beam shown in Fig. 1.

The scale beam 1 of the device shown in Fig. 1 is pivotally suspended by means of the fulcrum loop 3 and is provided with the balance ball 4 mounted on the balance ball rod 5, and with the back loop 6 connected by rod 7 with the levers of the weighing mechanism (not shown). The scale beam is provided with the point loop 8 upon which is suspended the counterpoise hook 9, adapted to carry the usual counter-weight.

So much of the parts as have been above described and specifically designated by numerals are of the ordinary and well known construction and I will now describe my improvements and the manner in which the same are applied to the scale beam and operated.

Upon the scale beam 1 in place of the ordinary sliding poise or weight, I place a sliding poise 11, having near its upper end the ordinary pointer 12 which indicates the weight in pounds and divisions of a pound on the graduations 2 of the scale beam, and having the supplementary pointer 14 extending downwardly from its lower end, in proximity to a cylindrical casing or cover 15 which is suspended from the scale beam 1 by hangers 16 having bifurcated upper ends 17 that embrace the lower edge of the scale beam near each end and are attached to the scale beam by screws 17. The casing or cover 15 is rigidly attached to the hangers and moves with the scale beam and is formed with a long and comparatively narrow slot or opening 18 and with an opening 19 located adjacent to one end of the slot 18 and in alinement therewith. A cylinder 20 is arranged within the casing or cover 15 and is fast on and carried by a shaft 21 which is journaled in the hangers 16, this shaft projecting through one of the hangers and carrying on its end a thumb nut or wheel 22 by means of which the shaft and the cylinder 20, may be turned in either direction. The cylinder 20 and the casing or cover 15 should be hollow and very light so as not to impose unnecessary weight upon the scale beam and I prefer to make the casing or cover of thin sheet metal and to make the cylinder of stiff paper or of celluloid, but other suitable material may be employed in place of those mentioned.

The external surface of the cylinder is divided by longitudinally disposed parallel lines into longitudinal spaces and these lines have adjacent graduations 23, the graduations being different for each line and suitably spaced and numbered to give the total amount in dollars and cents of goods the price per pound of which is represented by the figure arranged at the end of each line and which shows through the opening 19 in the casing or cover 15. The rows of figures in each longitudinal space of the cylinder are successively brought into sight through the slot or opening 18 and the particular graduation indicated by the supplementary pointer 14 of the poise 11, indicates the exact total price of the goods the weight of which is indicated on the scale beam by the pointer 12.

In operating the device the goods are placed on the platform or in the pan of the scale and the cylinder 20 is turned by means of thumb nut 22 until the number corresponding to the price per pound of the goods to be weighed appears within the opening 19. The poise is then moved along the scale beam until the scale beam is balanced, at which time the supplementary pointer will indicate on the row of graduations showing through the slot 18 the exact total price of the amount of goods on the platform or pan of the scale.

The modified form of the device shown in Fig. 5 shows my invention applied as a calculating device to a stationary beam or rod 24 which is graduated at 25 into yards and fractions of yards and in this form of my device, since the beam or rod 24 is not pivoted, but is rigidly supported on standards 26, the poise used with the pivoted scale beam is unnecessary and is replaced by a sliding block 27 which has an upper pointer 28 and a lower pointer 29. The other parts of the mechanism in this form of my device correspond to those of the form shown in Fig. 1 and need not therefore be again described. The numbered graduations on the longitudinal spaces of the rotary cylinder in this form are arranged to show the price of a certain number of yards and fractions of yards and the numbers at the ends of these longitudinal spaces correspond of course to the price per yard of the goods being sold.

In using the device shown in Fig. 5 the goods are measured in the usual way and the cylinder is turned around until the figure corresponding to the price per yard appears within the opening 19. The block 27 is then moved along the rod until the upper pointer 28 is opposite a figure corresponding to the number of yards previously measured off. The lower pointer 29 will at this time indicate on the cylinder the total price of the goods.

In the modified form of poise shown in Fig. 6 the lower pointer is in a separate piece and is attached to the ordinary poise by a screw 30, thus obviating the provision of a new poise where my improvement is applied to an old scale.

I claim:

1. In a steelyard weighing scale, the combination with the scale beam pivoted at one end and a freely sliding counterpoise having a supplementary pointer of a cylindrical casing detachably secured to the beam, and depending therefrom, a graduated cylinder pivotally mounted within said casing and rotatable in the casing independently of the movement of the counterpoise and means for rotating said cylinder said casing being formed with a longitudinal slot through which the graduations on the cylinder are exposed and with which the supplementary pointer of the sliding counterpoise coincides.

2. In a device of the character described, the combination with a scale beam having a graduated side, of a freely sliding member arranged on said beam and provided with two pointers, one pointing to the graduations on the beam, the other extending below the beam, a cylindrical casing suspended below the beam and having a longitudinal slot and a graduated cylinder arranged in said casing and freely rotatable therein independently of the movement of said sliding member.

3. In a device of the character described, the combination with a beam having a graduated side, of a freely sliding member arranged on said beam and provided with two pointers, one pointing to the graduations on the beam, the other extending below the beam, a cylindrical casing suspended below the beam and having a longitudinal slot and a graduated cylinder arranged in said casing and freely rotatable therein independently of the movement of said sliding member.

In testimony whereof I have affixed my signature, in presence of two witnesses.

ISAAC L. DAVENPORT.

Witnesses:
CHAS. B. CONNOLLY,
BLANCHE STAPLES.